Oct. 21, 1941.                J. C. AUTEN                2,259,790
                           WINDSHIELD WIPER
                           Filed March 1, 1939
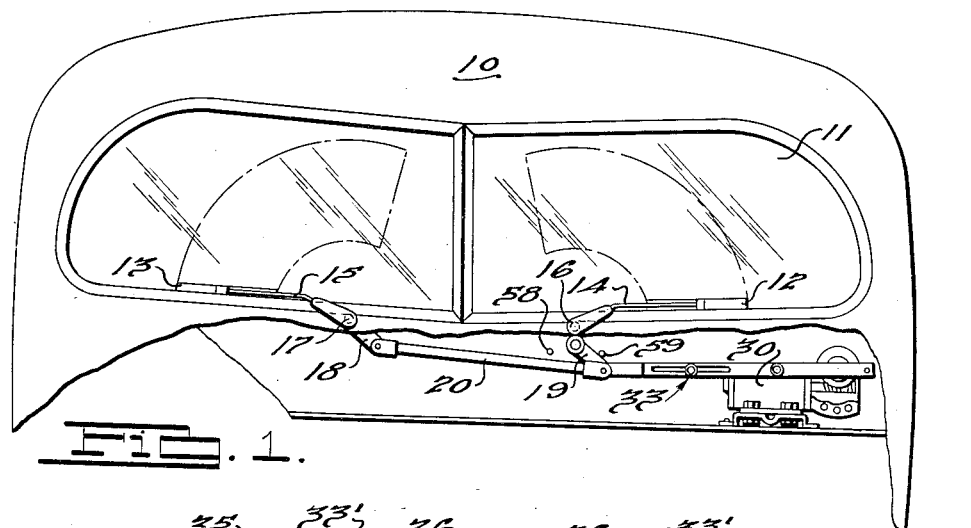
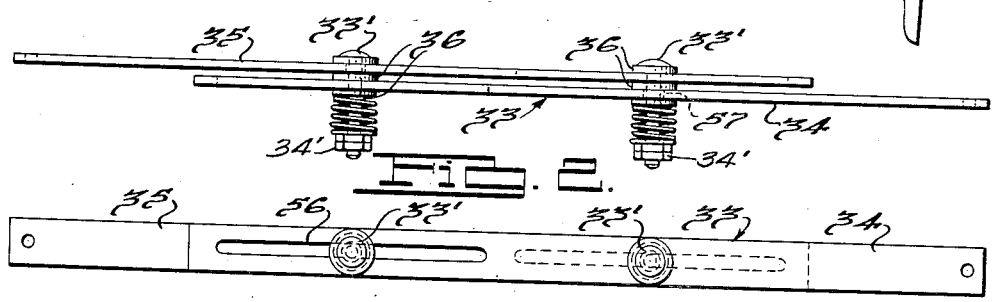
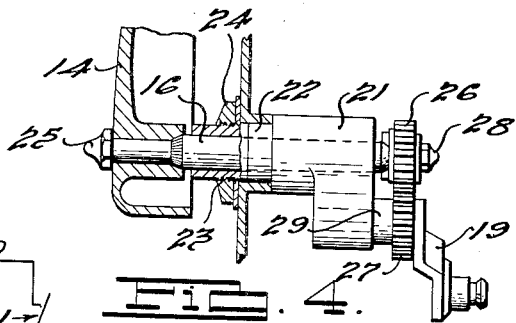
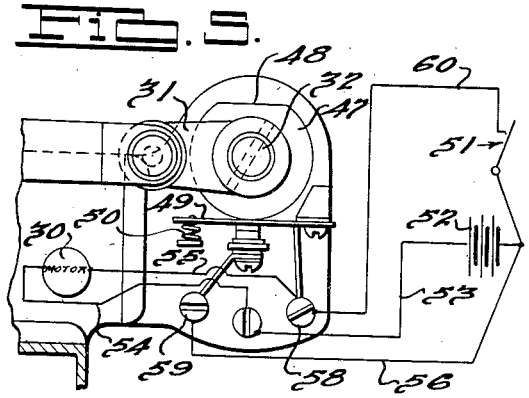
INVENTOR
Jay C. Auten.
BY Harness, Lind, Patee & Harris
ATTORNEYS.

Patented Oct. 21, 1941

2,259,790

UNITED STATES PATENT OFFICE 2,259,790

WINDSHIELD WIPER

Jay C. Auten, Royal Oak, Mich., assignor to Chrysler Corporation, Highland Park, Mich., a corporation of Delaware Application March 1, 1939, Serial No. 259,226

3 Claims. (Cl. 15—255)

This invention relates to windshield wipers and mountings therefor.

More particularly, the invention pertains to dual windshield wiper mechanism for automobiles and to mounting means for said mechanism.

Heretofore, considerable difficulty has been encountered during automobile assembly operations in connecting up the actuating linkage of the windshield wiper mechanism in such manner that the throw of the wiper blades will be properly centered in the windshield. This difficulty is due to the fact that although the openings in the vehicle body cowl through which the wiper blade actuating shafts project are accurately centered with respect to each other, the windshield wiper motor is mounted independently on the body and it has been found that, with the ordinary production tolerances, this cannot be done with sufficient accuracy to eliminate the need of adjustment between the motor and the wiper actuator bar.

Modern windshield wiper mechanisms are usually controlled by a finger actuated control button mounted in the driver's compartment of the vehicle, and are designed to be put into operation by a single movement of the control button in one direction and to be rendered inoperative by a single movement of the button in the opposite direction. It is necessary to adjust the linkage connecting the motor with the wiper blades so that the blades will automatically "park" themselves out of the driver's field of vision when the control button is moved to "stop" position. This adjustment is a troublesome and time-consuming one and is particularly bothersome when dual wipers are involved due to the fact that the wiper blades must be mounted so as to move in opposite directions and in synchronism.

Due to the modern practice of building automobiles on a continuously moving conveyor line, it frequently happens that the wiper motor is mounted in the vehicle at some point remote from the place where the wiper linkage is installed and by a different workman. It is then particularly that the above mentioned difficulties have been the cause of delay in assembling and have increased considerably the time required for the assembly of a complete vehicle with consequent increase in cost thereof.

It is the object of the invention to provide a simple method of mounting dual windshield wiper mechanism on a vehicle in such manner that no adjustment of the wiper motor or actuator bar is necessary to place the mechanism in operating condition after it has been mounted on the vehicle.

It is a further object of the invention to provide an improved linkage for connecting the driving motor of windshield wiper mechanism to the blade thereof which automatically adjusts itself upon operation to compensate for inaccuracies in the mounting of the various elements of the mechanism.

An illustrative embodiment of the invention is shown in the accompanying drawing, in which:

Fig. 1 is a fragmentary front elevational view of a vehicle body broken away to show the details of the windshield wiper mechanism.

Fig. 2 is a plan view of the adjustable arm which connects the wiper motor with the wipers.

Fig. 3 is an elevation of the arm shown in Fig. 2.

Fig. 4 is a section along line 4—4 of Fig. 1.

Fig. 5 is a diagrammatic view of the wiring showing the reversing and stop mechanism for the windshield wiper motor.

Referring to the drawing in which like reference characters designate like elements referred to in the following specification, the vehicle body 10 has mounted in the front portion thereof a V-type windshield 11 having two transparent panels, a portion of each of which is cleaned by the wiper elements 12 and 13 which are adapted to be oscillated over the surface of the respective panels by mechanism about to be described.

The wiper elements or blades 12 and 13 are mounted on the outer ends of levers 14 and 15 respectively, which are in turn pivotally mounted on the body by means of shafts 16 and 17, respectively.

Shaft 16 is mounted as shown in Fig. 4 in a casting 21 having a reduced square end portion 22 which fits into a complementary square hole punched in the body panel 10. The casting 21 has a reduced round portion which protrudes through the panel and is threaded at 23 for the reception of a nut 24 which secures the whole assembly to the body panel.

The arm 14 is secured on the reduced outer end portion of shaft 16 by means of the nut 25. Shaft 16 also has an inner reduced portion on which a gear 26 is fixed by means of the nut 28. A second shaft 29, pivotally mounted in the casting 21, has a gear 27 and a crank arm 19 fixed thereto. The gears 26 and 27 are in meshing engagement and crank arm 19 is interconnected with a similar arm 18 which is fixed directly to shaft 17 by means of a bar 20. It can thus be seen that the wiper blades 12 and 13 may be oscillated oppositely to one another and in synchronism.

The wiper motor 30 is mounted on a flange underneath the cowl portion of the body and is electrically operated. It is understood, however, that any other suitable type of motor may be substituted without departing from the spirit of the invention.

The motor 30 drives, through suitable speed reducing mechanism, a shaft 32 which has a crank 31 keyed thereon. An adjustable link 33 interconnects the crank 31 with the arm 19 (Fig. 1). The link 33 consists of two parts designated 34 and 35 respectively, secured together for relative sliding movement by spring loaded bolts 33', of which there are two in the preferred embodiment shown in the drawings. Adjusting nuts 34' are provided for varying the tension of the springs.

The parts 34 and 35 are identical, each being provided with a slot 56 and a hole 57, and are assembled in such manner that bolts 33' project through a hole in one part and a slot in the other as shown in Figs. 2 and 3. Washers 36 of friction material, such as felt or sintered oil-impregnated material, may be provided on each side of each of the slots as indicated to facilitate sliding. It is apparent that the link 33 may be varied in length by sliding the parts 34 and 35 relatively to one another. This feature forms an important part of the invention, the purpose of which will presently appear.

The motor shaft 32 also has an annular cam 47 mounted thereon for rotation therewith. The cam 47 has a flat portion 48 on its periphery which cooperates with a spring biased switch 49 to open the motor circuit once during every revolution of the shaft 32. The switch 49 is urged to open position by the spring 50, but is maintained in closed position by the circular peripheral portion of the cam 47 during a major part of its rotation.

A manually operated switch 51 is provided for stopping and starting the wiper mechanism as the driver desires. With the wiper mechanism operating and the switch in open position, as shown in Fig. 5, the motor 30 receives current from the battery 52 through lines 53, 54, 55, through the switch 49 which connects binding posts 58 and 59, and through line 56. It will be appreciated, however, that as soon as the flat portion 48 of the cam 47 rotates sufficiently to contact the spring biased lever of switch 49, the switch will open under the influence of spring 50, thereby opening the line between binding posts 58 and 59 and stopping the motor.

When the manually operated switch 51 is closed, the line 60 forms a shunt connection around the cam operated switch 49 and the motor receives current at all times regardless of the position of the switch lever 49.

It can therefore be readily seen that the wiper mechanism will operate during the time that the switch 51 is closed and will cease operation only when both switch 51 and switch 49 are open. As the switch 49 is open only when the wiper blades are in the position shown in Fig. 1, it is obvious that the blades will automatically stop when they reach their parked position whenever switch 51 is open.

A pair of stop pins 58 and 59 are fixed to the cowl portion of the body in close proximity to the arm 19 to accurately fix the limits of the stroke of the arm and thus of the wiper blades 12 and 13.

When the mechanism is assembled on the body, the wiper blades together with the arms 14, 15, 18 and 19, the shafts 16, 17 and 29, the gears 26 and 27 and the bar 20 are assembled in such position with relation to one another that the blades 12 and 13 will be in parked position (as shown in Fig. 1) when the arm 19 is against the stop 59.

The motor 30, which will have been mounted on the body by a different workman at another point on the assembly line, may then be connected to the actuating mechanism by the link 33. The assembly of the wiper mechanism is now complete, no further attention other than the routine inspection being necessary.

Before my invention, considerable time was consumed in connecting the motor with the actuating mechanism because of the fact that it was necessary to fix both the motor shaft and the actuating linkage mechanism in parked position before the rigid link connecting the motor crank 31 with the actuating mechanism could be assembled. This was necessary because the wiper blades must be in their parked position at the same instant that the flat surface 48 of the cam 47 is in contact with the switch blade 49, otherwise the blades cannot be stopped in parked position.

Because of manufacturing tolerances, the mounting of the motor 30 varies somewhat with relation to shafts 16 and 17, thus the workman had to readjust the position of motor 30 by means of shims, or procure a link of slightly different length, or both.

This difficulty is entirely eliminated by the present invention. The link 33 may be attached to the arm 19 and to the crank 31 without regard to the positions of these parts. Any errors due to faulty mounting of the motor 30 or to lack of correlation between the arm 19 and the crank 31 will be automatically compensated for when the motor 30 is set in operation. If the link 33 is too short, it will be lengthened by the pull of the motor when arm 19 comes to rest against the stop pin 59. If the link 33 is too long, it will be automatically shortened by the push of the motor 30 when arm 19 comes to rest against the stop pin 58.

In practice the nuts 34' are set so that there is a load of approximately 40 pounds imposed on the link parts by the springs. This load is well within the power range of the motor and is sufficient to hold the parts 34 and 35 against relative movement during ordinary operation of the wipers. However, it will be apparent that the pressure load on the link parts may be varied to suit any given conditions.

My novel link 33 has another important function in that it eliminates the spring loaded clutches usually provided to prevent damage to the parts should one or both of the wipers become immovable due to ice, snow or other obstruction on the windshield. These spring loaded clutches are conventionally provided on the pivot shafts for the wiper arms and permit the shafts to "slip" with respect to the arms should either or both of the wiper blades become stuck. After freeing the stuck blade, it is almost always necessary to readjust the linkage so that the wiper blades will stop in "park" position when the motor is stopped. This has been a source of considerable annoyance to automobile drivers living in cold climates where the blades frequently freeze to the windshield. With my invention, should one or both of the blades become stuck, the parts 34 and 35 will slide relatively to one another and no damage to the mechanism will result, nor will the relative positions of the arms 14, 15, 18, 19 and the bar 20 be disturbed as is the case with the conventional arrangement described above. After freeing the stuck blades, it is only necessary for the driver to start the motor and the parts will be returned to their corresponding operative positions by the action of the stop pins 58 and 59 and the link 33.

It is to be understood that while a preferred embodiment of the invention has been described, it is not desired to limit the spirit or scope of the invention except as defined in the claims annexed hereto.

I claim:

1. Power actuated windshield wiper mechanism comprising in combination, a wiper blade adapted to be oscillated over a windshield in a predetermined path, a motor for actuating said blade, link means connecting said blade and motor comprising a pair of relatively slidable parts and means for securing said parts together, said securing means being adapted to secure said parts against relative movement during normal operation of said mechanism, but releasable to permit movement under overload conditions.

2. Power actuated windshield wiper mechanism comprising in combination, a wiper blade adapted to be oscillated over a windshield in a predetermined path, a motor for actuating said blade and link means connecting said blade and motor comprising a pair of relatively slidable parts and means releasably securing said parts against relative sliding movement, said means including spring loaded pressure means and means for varying the pressure thereof thereby to vary the load conditions under which said securing means will release.

3. Windshield wiper apparatus comprising in combination, a wiper blade adapted to be oscillated over the surface of a windshield, a motor, a link connecting said motor with said blade comprising relatively slidable members secured against sliding movement during oscillation of said blade but automatically releasable for relative sliding movement upon stoppage of said blade, and means operatively associated with said blade for defining the stroke thereof and so arranged relatively thereto that the length of said link is automatically adjusted when said apparatus is set in operation.

JAY C. AUTEN.